June 19, 1951 — L. HICKOX — 2,557,380
METHOD AND PROJECTION DISPLAY MEANS FOR EVALUATING VISIBILITY
Filed April 27, 1949

INVENTOR.
Lee Hickox,
BY Wilkinson, Huxley,
Byron & Hume
Attys.

Patented June 19, 1951

2,557,380

UNITED STATES PATENT OFFICE 2,557,380

METHOD AND PROJECTION DISPLAY MEANS FOR EVALUATING VISIBILITY

Lee Hickox, Chicago, Ill., assignor to Container Laboratories, Inc., Chicago, Ill., a corporation of Illinois Application April 27, 1949, Serial No. 89,945

9 Claims. (Cl. 88—24)

The present invention relates to improvements in methods and means for evaluating the visibility of various articles.

More particularly, the present invention relates to methods and means for definitely determining the relative visibilities of various articles, such, for example, as articles on display in self-service stores, advertising media, and other articles commonly associated with merchandising.

The present invention in its fundamental aspects makes use of photography either in color or in black and white, photographs being taken at the point of display to be studied and evaluated at leisure at any convenient place.

An object of the present invention is to provide a method and means for comparing the relative visibilities of different objects, so that the one most readily discernible to most people under varying conditions of illumination, time of observation, and clearness of display, may be selected.

A further object is to provide portable mechanism capable of being used in places available to persons whose mass reaction is to be evaluated.

A further object is to provide an improved method for assigning definite mathematical values to the visibility factors of the object being studied.

A further object is to provide means for assigning definite mathematical values to the visibility of various objects as they appear to the public; for example, at the place of display or sale.

A further object is to provide a means for previewing, judging and evaluating colored objects which will be reproduced in black and white when displayed by various methods, such as by television.

A further object is to provide means and methods for evaluating and measuring visibility which is so simple in operation that persons with a minimum of technical skill may practice the invention.

A further object is to provide a means and method for calibrating three important variables that influence visibility to ordinary observers, such as shoppers, in a self-service store.

A further object is to provide an improved means for reproducing conditions under which a shopper normally observes merchandise whereby the relative visibilities of various pieces of merchandise may be evaluated.

A further object is to provide an improved means and method for objectively studying under laboratory conditions views of articles as they are actually displayed in a store, or the like.

Further objects will appear as the description proceeds.

Referring to the drawings—

Figure 1:
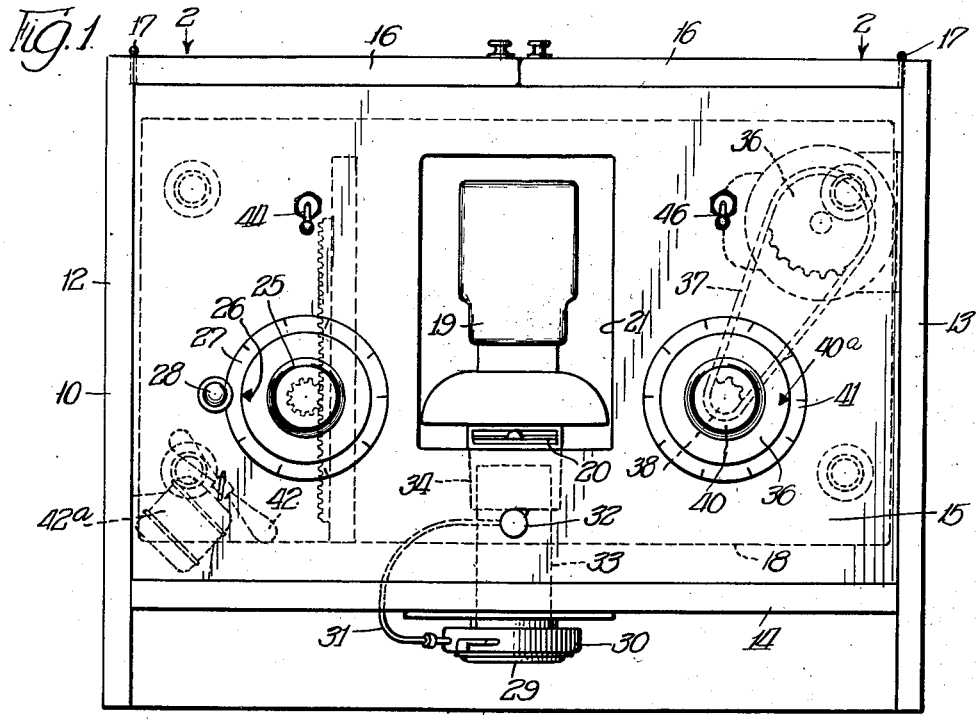
Figure 1 is a top plan view of a device for conveniently displaying and evaluating transparent slides, which may represent competitive packages of merchandise, competitive layouts, competitive advertising displays, or other articles.
Figure 2:
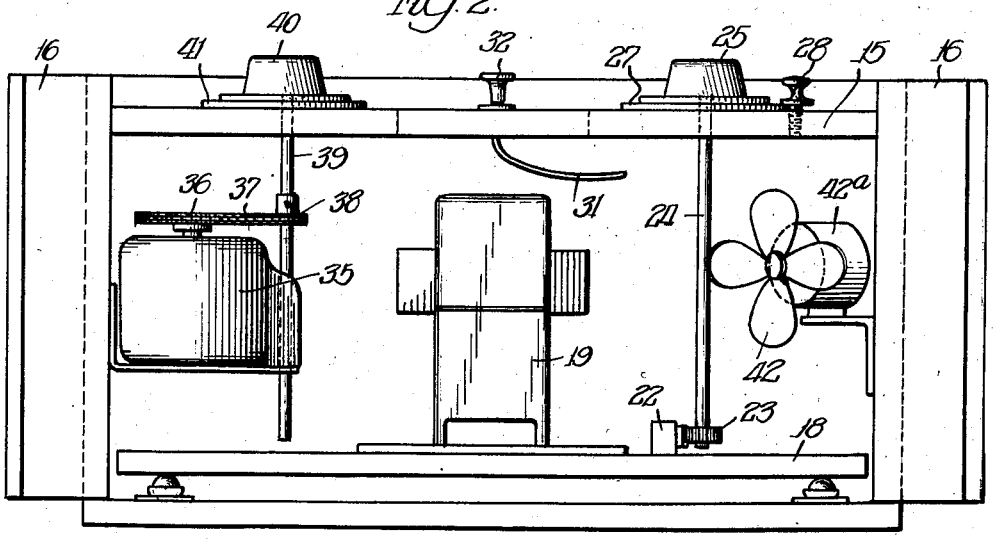
Figure 2 is a view of the structure illustrated in Figure 1, taken in the direction of the arrows 2—2 of Figure 1, with the rear doors in open position.

A description of the structure illustrated in Figures 1 and 2 may be prefaced by the statement that in the practice of the present invention transparent slides, preferably in color, will be taken of articles, the visibility of which is to be evaluated, said slides being of the usual type which may be projected upon a screen. These slides may illustrate competitive articles either in the same slides or in different slides, but in any case the invention contemplates means for evaluating the relative visibilities of such competitive articles.

The present invention contemplates the evaluation of visibility with reference to three distinct factors, to wit:

(1) Sharpness of focus;
(2) Illumination quality or light intensity;
(3) Time necessary for identification.

To achieve this end, the structure illustrated in Figures 1 and 2 provides means for evaluating (1) the relative degree to which an article may be out of focus at which said article may be identified; (2) the relative amount of illumination required for identification of the article; and (3) the time interval necessary for identification.

Referring to Figures 1 and 2, the numeral 10 indicates a casing having a bottom 11, side walls 12 and 13, front wall 14, top wall 15, and rear doors 16—16, which may be swung to open positions upon the hinges 17—17. Slidably mounted upon the floor 11 is a platform 18 rigidly carrying the projector housing 19 adapted to project transparent slides, the carrier for such slides being indicated by the numeral 20. The top wall 15 of the casing 10 may be provided with the aperture 21 providing access to the projector housing 19, with its slide carrier 20. The platform 18 has rigidly connected therewith the rack 22, with which meshes a pinion 23 mounted upon a vertical shaft 24 controlled by the knob 25.

By turning the knob in one direction or the other, the platform 18 with its projector 19 may be moved forwardly or rearwardly of the casing 10. The knob 25 is provided with a pointer 26 adapted to cooperate with a dial 27 carried by the top wall 15 of the casing 10. The dial 27 may be calibrated in any preferred way and the zero setting thereof may be adjusted by turning said dial. The adjustment of the dial 27 may be maintained by means of the set-screw 28 adapted to engage the peripheral portion of said dial 27.

Mounted upon the front wall 14 of the casing 10 is the projector lens 29 provided with the shutter 30, which may be of the usual photographic type. Said shutter will be controlled by the cable release 31, having the operating button 32 accessible in a region above the top wall 15. The lens 29 is mounted upon the tube 33, rigid with the front wall 14. The projector housing 19 is provided with the tube 34, having telescoping relationship with the tube 33 of the lens 29. As the platform 18 of the projector housing 19 is moved back and forth relative to the lens 29, the picture in the slide carried by the projector housing 19 may be brought into and out of focus.

By reason of the mechanism just described, it is possible to evaluate the degree to which an article may be out of focus to an observer's eyes while still being identifiable.

In order to provide means for evaluating the degree of illumination under which an observer may identify an article to be evaluated, the present invention contemplates means for varying the illumination produced by the projector. To this end, a rheostat 35 is provided, having a sprocket wheel 36 connected by means of the sprocket chain 37 to a sprocket wheel 38 rigid with the vertical shaft 39. Said shaft 39 has connected thereto the knob 40 adapted to co-operate with the dial 41, which may be calibrated according to any arbitrary scale, said knob being provided with a pointer 40a co-operating with said scale. By turning the knob 40, it is possible to adjust the rheostat 35 to vary the illumination produced by the projector 19. By the mechanism just described, it is possible to evaluate the degree of illumination necessary for an observer to recognize the article the visibility of which is to be evaluated.

To evaluate the time element, or the interval of time required for identification of the article the visibility of which is to be evaluated, Figure 1 illustrates the shutter 30 for controlling the opening of the lens 29. Said shutter 30 may be of the usual photographic type, and should give measured intervals of time of opening of said shutter ranging from, say, $\frac{1}{200}$ of a second up to one second. The shutter 30 may be controlled by means of the cable release 31 having the operating button 32.

The numeral 42 indicates a fan which may be driven by the motor 42a for cooling the projector housing 19.

Figure 3:
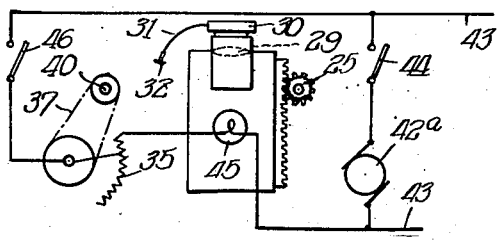
Figure 3 is a diagrammatic view illustrating the fundamental features of the structure shown in Figures 1 and 2.

Figure 3 represents diagrammatically an electric circuit which may be employed, together with the controls, for varying focal quality, illumination quality, and the time element, as above mentioned. The numerals 43—43 represent the two wires of an electric circuit. Across said wires 43—43 is connected a circuit which includes the fan motor 42a and a switch 44 for controlling the energization of said fan motor. Also connected across said wires 43—43 is a circuit which includes the lamp 45 of the projector housing 19, the rheostat 35, and the switch 46, for controlling said circuit. Figure 3 also illustrates the sprocket chain 37 and the two knobs 40 and 25 for controlling the rheostat 35 and the position of the platform 18 which carries the projector housing 19 with its lamp 45. Figure 3 also illustrates the lens 29 with its shutter 30, which shutter is controlled by the cable release 31, having the operating button 32.

In describing the method embodied in the present invention, it may be stated that photographs will be taken of the articles to be evaluated, which photographs may be in color or in black and white. Said photographs should be transparencies and may conveniently be of a size to fit within the usual 2-inch by 2-inch slides.

In case it is desired to evaluate the visibility or customer identification of articles displayed on a display shelf, the photographs should be taken at the points where they will be presented for customer selection. In the event of a card the photographs should be taken at the points where said cards are displayed. In the case of an advertising layout on the page of a newspaper, or the like, the photographs should be taken of such newspaper page, or the like.

It will be remembered that an object of this invention is to provide a means and method for reducing to a definitely calibrated measurement the visibility of a package, advertising matter, or the like.

Inasmuch as a large proportion of the purchasing public has subnormal vision, a problem which confronts the merchandiser is to evaluate a package or display which will be discernible and identifiable by persons of subnormal vision, as well as those having vision more nearly normal.

In order to evaluate packages or displays for sharpness of focus, a transparent slide showing a sharply focused picture of the article or articles to be evaluated would be mounted within the projector housing 19. The knob 25 will be turned to move the platform 18 and projector housing 19 to a position in which the picture is definitely out of focus. The set-screw 28 will be turned down to hold the scale 27 in fixed position. The knob 25 will then be turned to move the platform 18 and projector housing 19 toward the position of proper focus. Preferably observations will be made by a number of people, including those wearing glasses and those who do not have to wear glasses. As the button 25 with pointer 26 is moved, the point at which each observer definitely identifies any certain article in the picture will be noted by reference to the reading of scale 27 adjacent to the pointer 26. By this method the threshold of identification of the salient articles in the picture may be averaged and a definite mathematical evaluation arrived at by averaging the values at which each of the observers first identified any particular article or articles. If one particular package is to be evaluated, it may be photographed as one of various groups whereby the relative sharpness of focus of that particular article may be determined with reference to different groupings.

The light conditions in the store or display room in which articles are displayed will vary materially under different conditions, and the present invention contemplates a method for evaluating the visibility of articles under varying light conditions. For this purpose, a sharply focused transparency will be mounted in the projector housing 19, but the knob 40 will be turned to a position throwing sufficient resistance into the circuit of the lamp 45 to make the picture so dark that the articles in said picture are not identifiable. Such a position may be indicated as zero on the dial 41.

The knob 40 will then be turned to cut out resistance from the circuit of the lamp 45 and when any observer or observers are able to identify any article shown in said picture, the point at which he or they first recognize said article will be noted by reference to the reading of the scale 41 with respect to the pointer 40a. An average of the readings according to different observers will give a mathematical indication of the relative visibilities of the article being evaluated under varying light conditions.

An observer in a store or in a car or glancing over a newspaper, or the like, will give fleeting glances, and the visibility of various articles with respect to identification during such fleeting glances may be evaluated according to the present invention. For this purpose a sharply focused transparency of an article or group of articles to be evaluated will be mounted in the projector housing 19, the shutter 30 being closed at this time. The operator will push the button 32 of the cable release 31 to cause a quick exposure of the picture on the transparency.

If any observer or observers can identify any article or articles shown in the picture, the time of such exposure will be noted. Longer exposures will be made by successive openings of the shutter 30, and the lengths of exposures at which observers identify objects in the transparency will be noted. By averaging the reactions of various observers the mathematical evaluation may be arrived at of the features of the articles on display relative to visibility and identification by the ordinary observer.

It should be recognized that an article which shows up best under the change of focus test may not show up so well under the change of illumination test as another article, and may not show up so well under the time of ilumination test as still a third article. The present invention has the advantage that the relative merits of a package display, position of display, and other factors may be independently evaluated to the end that the merchandise may coordinate the various features of display dress, position with respect to illumination, and opportunity for prolonged observation so that the identification of any particular article which he wants to push will be promoted.

The advantages of the present invention need not be recited in detail, but it may be stated briefly that by means of the present invention a merchandiser may arrive at a definite mathematical comparison of his package with packages of his competitors under the three conditions above outlined.

Moreover, in cases where a manufacturer or merchandiser is contemplating changes in his package, the evaluation under the conditions above outlined may be made by means of photographs of different layouts.

Though an important advantage of the present invention resides in its evaluation of the visibility and likelihood to be identified by the ordinary customer of articles in color, it will be understood that it is also visible in case of articles in black and white, such, for example, as displays on the page of a newspaper.

Another advantage of the present invention is that the attractiveness of an article when advertised over television may be evaluated. At the present time television pictures are in black and white even though colored articles are being televised. In order to arrive at evaluation of a colored article, it is feasible either to take the pictures in color and to thereafter remove the color from the transparency, or to take the transparent picture in black and white. By reason of the present invention, the probable reaction of the viewers of television displays of the articles may be foretold.

An important advantage of the present invention is that it provides for the taking of pictures of the articles to be evaluated at the points of display of said articles, which pictures may be shown to observers at any convenient time and place after which the reactions of said observers may be averaged and studied at any convenient time and place.

Though a preferred embodiment of the means and preferred steps in the method according to the present invention have been described in detail, many modifications will occur to those skilled in the art. It is intended to cover all such modifications as fall within the scope of the appended claims.

What is claimed is:

1. The method of evaluating the visibility of an article which consists in projecting a picture of said article, varying the illumination of said picture and noting by arbitrary calibration the threshold at which each of a plurality of observers first identifiies said article, and projecting said picture at different precisely timed projection periods, noting the length of time of such projection periods at which each of a plurality of observers first identifies said article, and averaging such notations both as respects the amount of illumination and time of projection.

2. The method of evaluating the visibility of an article which consists in projecting a picture of said article out of focus, varying the focus of said picture toward proper focus and noting by arbitrary calibration the threshold of identification of said article by an observer when said picture is moved toward proper focus and projecting said picture at different precisely timed projection periods and noting the shortest time at which an observer can identify said article in said picture.

3. The method of evaluating the visibility of an article which consists in projecting a picture of said article upon a screen out of focus, varying the degree of focus of said picture toward proper focus and noting by arbitrary calibration the threshold of identification of said article by each of a plurality of observers and projecting said picture at different precisely timed projection periods, noting the shortest length of time of such projection periods at which each of a plurality of observers can identify said article and averaging such notations both with respect to change of focus and change in projection time.

4. The method of evaluating the visibility of an article which consists in projecting a picture of said article upon a screen out of focus, varying the degree of focus of said picture toward proper focus, noting the threshold of identification of said article by an observer when said picture is moved toward proper focus, projecting said picture, varying the illumination of such picture, and noting the point at which said article is first identified by an observer and projecting said picture at different precisely timed projection periods, noting the length of time of such projection periods at which an observer can first identify said article and combining said notations to determine the visibility of said article.

5. The method of evaluating the visibility of an article which consists in projecting a picture of said article upon a screen, varying the degree of focus of said picture and noting by arbitrary calibration the threshold of identification of said article by each of a plurality of observers, projecting said picture upon a screen, varying the illumination of such picture and noting by arbitrary calibration the thresholds of identification of such article by each of a plurality of observers, and projecting a picture of said article at different precisely timed projection periods, noting the length of time of such projection periods at which each of a plurality of observers can identify said article, and combining said notations in evaluating the visibility of said article.

6. Apparatus for evaluating the visibility of an article including a projector for slides, means for modifying the focus of said projector, means for calibrating the distance between a completely out of focus position and the proper focus position of said projector, means for varying the illumination of said projector, and means for calibrating the difference between approximately complete lack of illumination and approximately complete illumination of said projector, said projector being provided with a shutter adapted to be controlled for different precisely timed projection periods.

7. Apparatus for evaluating the visibility of an article including a projector for slides, means for modifying the focus of said projector, means for calibrating the distance between a completely out of focus position and the proper focus position of said projector, means for varying the illumination of said projector, and means for calibrating the difference between approximately complete lack of illumination and approximately complete illumination of said projector, said projector including a relatively movable lamp housing and a relatively fixed lens, said housing and said lens having co-operating tubes.

8. Apparatus for evaluating the visibility of an article including a projector for slides, means for modifying the focus of said projector, means for calibrating the distance between a completely out of focus position and the proper focus position of said projector, means for varying the illumination of said projector, and means for calibrating the difference between approximately complete lack of illumination and approximately complete illumination of said projector, said projector being provided with a shutter adapted to be controlled for different precisely timed projection periods.

9. Apparatus for evaluating the visibility of an article including a projector for slides, means for modifying the focus of said projector, means for calibrating the distance between a completely out of focus position and the proper focus position of said projector, means for varying the illumination of said projector, and means for calibrating the difference between approximately complete lack of illumination and approximately complete illumination of said projector, said projector being provided with a shutter adapted to be controlled for different precisely timed projection periods, said projector including a relatively movable lamp housing and a relatively fixed lens, said housing and said lens having co-operating telescoping tubes.

LEE HICKOX.

REFERENCES CITED

The following references are of record in the file of this patent:

UNITED STATES PATENTS

| Number | Name | Date |
|---|---|---|
| 1,174,547 | Clason | Mar. 7, 1916 |
| 1,282,743 | Brenkert et al. | Oct. 29, 1918 |
| 1,431,897 | Riddell | Oct. 10, 1922 |
| 1,821,626 | Fleischer | Sept. 1, 1931 |
| 2,147,648 | Greathouse | Feb. 21, 1939 |
| 2,150,543 | Ybarrondo | Mar. 14, 1939 |
| 2,184,507 | Jobe | Dec. 26, 1939 |
| 2,196,587 | Herrold | Apr. 9, 1940 |
| 2,230,149 | Weddington | Jan. 28, 1941 |
| 2,419,041 | Stewart | Apr. 15, 1947 |